United States Patent [19]

Savoy

[11] Patent Number: 4,707,247
[45] Date of Patent: Nov. 17, 1987

[54] DISK CASSETTE STORING

[75] Inventor: Robert L. Savoy, Arlington, Mass.

[73] Assignee: Savoy Leather Manufacturing Corporation, Haverhill, Mass.

[21] Appl. No.: 34,402

[22] Filed: Apr. 3, 1987

[51] Int. Cl.$^4$ .................................... B65D 85/672
[52] U.S. Cl. .................... 206/387; 206/561; 206/564; 220/22; 211/40
[58] Field of Search ............ 206/387, 493, 73, 453, 206/449, 561, 563, 564; 211/40; 312/350; 220/22

[56] References Cited

U.S. PATENT DOCUMENTS

| | | | |
|---|---|---|---|
| 3,756,383 | 9/1973 | Kryter | 206/387 |
| 3,856,369 | 12/1974 | Commiant | 206/387 |
| 4,117,931 | 10/1978 | Berkman | 206/564 |
| 4,231,473 | 11/1980 | Aprahamian | 206/387 |
| 4,293,075 | 10/1981 | Veralrud | 206/387 |
| 4,407,411 | 10/1983 | Lowry | 206/387 |
| 4,432,453 | 2/1984 | Berkman | 206/387 |

Primary Examiner—Joseph Man-Fu Moy
Attorney, Agent, or Firm—Charles Hieken

[57] ABSTRACT

A storage cabinet for storing in each of a number of stacked storage regions a boxed compact disk, a boxed compact cassette or a pair of unboxed compact cassettes includes a pair of opposed parallel side walls cantilevered from a rear wall and having stacked opposed pairs of protrusions defining a first storage region extending between the side walls for receiving a boxed compact disk or a pair of unboxed cassettes and each having a shelf spaced from the rear wall for defining a second storage region of width corresponding to that of a boxed compact cassette and depth less than the width of a boxed compact cassette for storing a boxed compact cassette so that it protrudes slightly beyond the free ends of the side walls.

4 Claims, 3 Drawing Figures

DISK CASSETTE STORING

The present invention relates in general to storing recordings and more particularly concerns novel apparatus and techniques for accommodating in the same storage locations compact disk cases, boxed cassettes and unboxed cassettes.

A search of subclasses 307-312 of class 206, subclass 40 of class 211 and subclasses 9 and 10 of class 312 uncovered U.S. Pat. Nos. 3,889,817, 4,082,385, 4,126,229, 4,231,473, 4,293,075, 4,366,903, 4,557,382, 4,396,123, 4,600,110, German Pat. No. 3,422,009, Italian Pat. No. 638690 and IBM Publication 8820.

U.S. Pat. No. 4,126,229 discloses the concept of storing record disks and cassettes in a structure completely different from the present invention. U.S. Pat. No. 4,293,075 discloses a cabinet for holding both magnetic tape cartridges and cassettes also with a structure different from the present invention.

It is an important object of this invention to provide an improved cabinet for storing boxed compact disks, boxed cassettes and/or unboxed cassettes with each storage compartment capable of accommodating any of these items.

According to the invention, there is means defining a plurality of stacked storage compartments bounded by a pair of spaced parallel side walls and a back wall perpendicular to the side walls with the separation between adjacent side walls corresponding substantially to the width of a compact disk box and substantially twice the width of an unboxed compact cassette. Each storage compartment is further defined by opposed members extending inward from the opposed side walls to define a first pair of recesses of height corresponding substantially to that of a compact disk box and an unboxed compact cassette extending along the width of the side wall from the free edge to the edge contacting the back wall from which the side walls are cantilevered. This structure also defines a recess of width corresponding substantially to that of a boxed compact cassette, height corresponding to the height of a boxed compact cassette and depth less than that of the width of a boxed compact cassette so that the edge of a boxed compact cassette seated therein may project slightly beyond the free edge of the side wall to facilitate removal. Preferably these recesses are defined by blow-molded plastic structure having a flock coating.

Numerous other features, objects and advantages of the invention will become apparent from the following specification in which.

Figure 1:
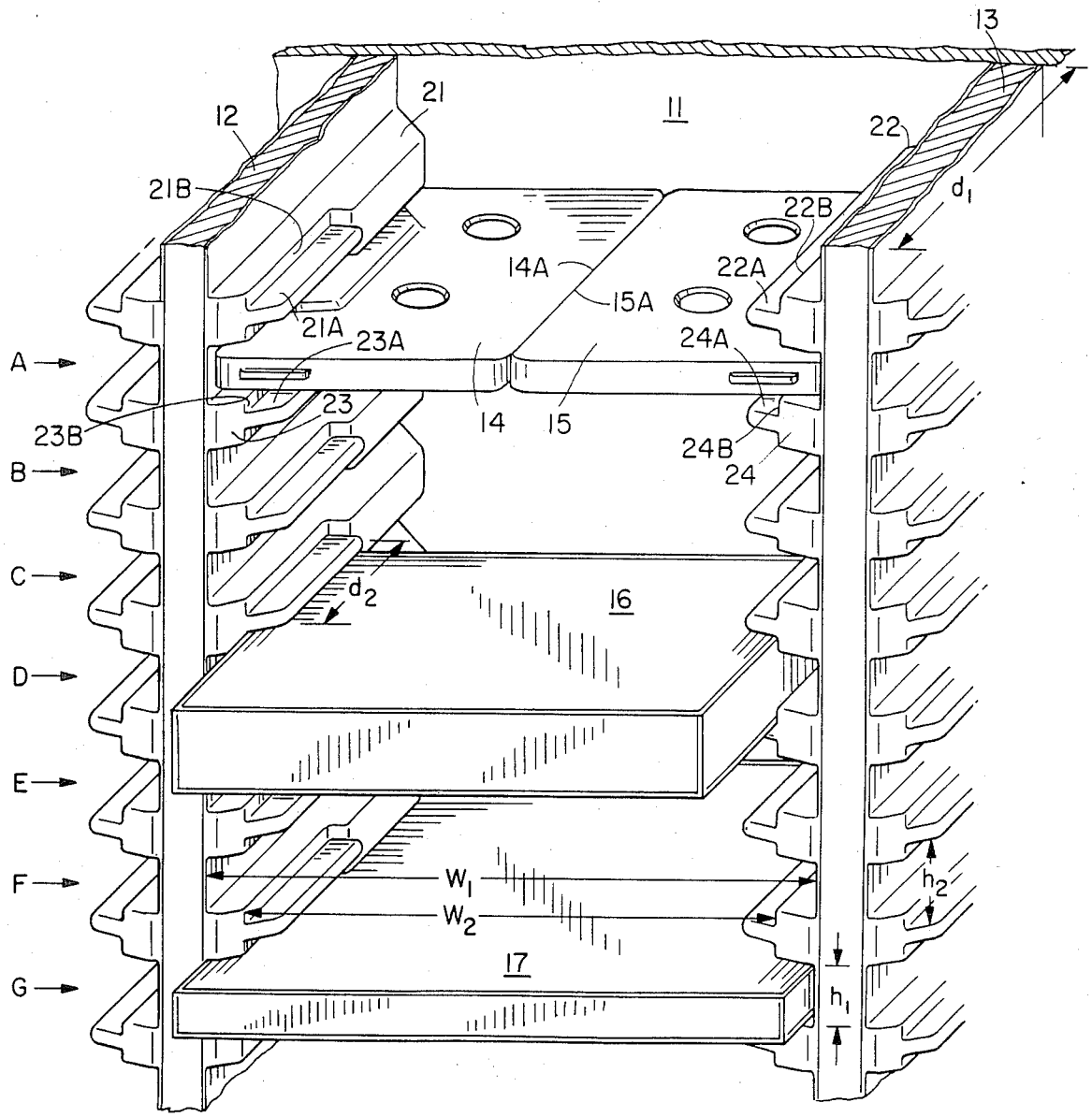
FIG. 1 is a fragmentary perspective view of an embodiment of the invention illustrating a stacked array of compartments with a top one storing a pair of unboxed compact cassettes, an intermediate one storing a boxed compact cassette and a lower one storing a boxed compact disk.
Figure 2:
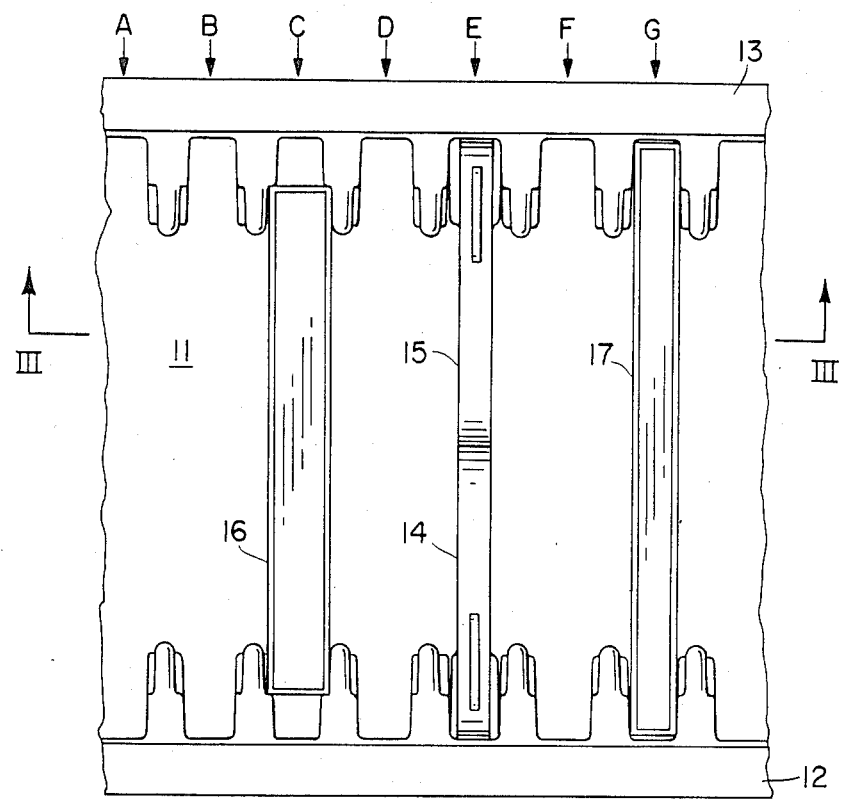
FIG. 2 is a fragmentary front view of the invention.
Figure 3:
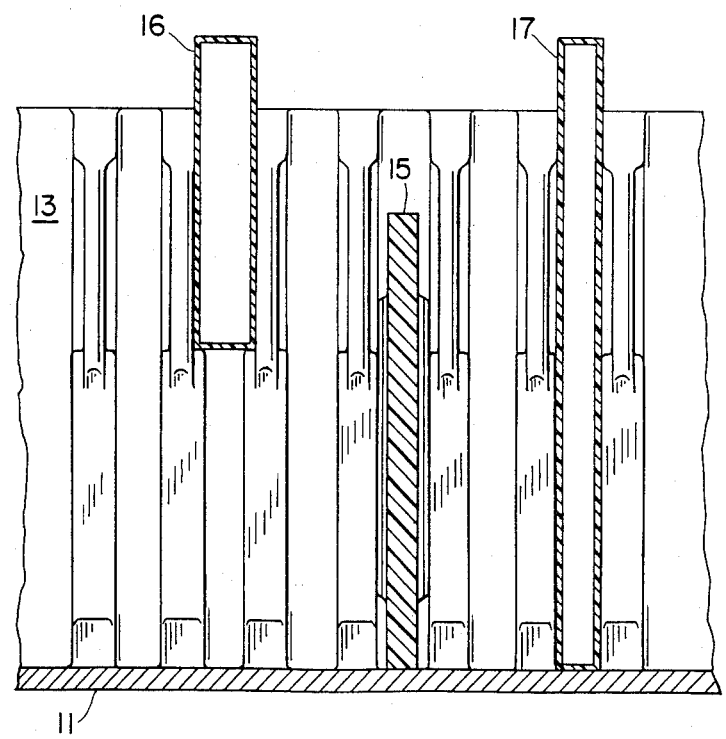
FIG. 3 is a sectional view through section III—III of FIG. 2.

With reference now to the drawing and more particularly FIG. 1 thereof, there is shown a fragmentary perspective view of an embodiment of the invention, which with the front and sectional views of FIGS. 2 and 3 best and fully illustrate the invention. There is shown seven compartment levels A-G, respectively. Back wall 11 and side walls 12 and 13 cantilevered from back wall 11 define a column of storage compartments. The storage compartment at level A stores a pair of unboxed compact cassettes 14 and 15 positioned as shown. Their closed sides 14A and 15A are in contact along the center line of the storage compartment. Their open edges through which the magnetic tape is exposed to a tape player are adjacent to side walls 12 and 13, respectively. The storage compartment at level D stores a boxed cassette 16. The storage compartment at level G stores a boxed compact disk 17.

Opposed pairs of protrusions, such as 21 and 22 extend inward from side walls 12 and 13, respectively, to help define a storage compartment. A similar pair of protrusions 23 and 24 coact with protrusions 21 and 22 to define the storage compartment at level A. Protrusions 23 and 24 also help define level B. In general each pair of protrusions defines a storage compartment above and a storage compartment below.

The protrusions, such as 21-24, are identical and coact to define a number of recesses dimensioned to allow any storage compartment to store a boxed compact disk, such as 17, a boxed compact cassette such as 16 and an unboxed pair of compact cassettes, such as 14 and 15. To this end the protrusions define a storage area having recesses bounded by side walls 12 and 13 with the separation between side walls 12 and 13 in these recesses corresponding substantially to the width of boxed compact disk 17 and substantially twice the width of an unboxed cassette, such as 14 or 15 with the recess height corresponding substantially to the height of the boxed compact disk and the unboxed compact cassette in the region near the exposed tape opening. This height is indicated as $h_1$ in FIG. 1 and the width designated $w_1$.

Each protrusion is also formed with a shelf, such as 21A, 22A, 23A and 24A, for accommodating a boxed cassette, such as 16. The perpendicularly intersecting walls, such as 21B, 22B, 23B and 24B define a narrower width $w_2$ corresponding substantially to the width of a boxed cassette, such as 16. The shelves, such as 21A and 23A, of the protrusion defining a compartment define a height $h_2$ corresponding substantially to the height of a boxed compact cassette, such as 16. They also define a depth $d_2$ that is typically slightly greater than half the width of a boxed cassette, such as 16. The width of each of side panels 12 and 13 defines a depth $d_1$ that is slightly less than the width of a boxed compact cassette.

Referring to FIG. 2, there is shown a front view of a stacked array of compartments with boxed compact cassette 16 moved up to level C and unboxed cassettes 14 and 15 moved down to level E. FIG. 3 is a view through section III—III of FIG. 2 to illustrate how a boxed cassette, such as 16, and a boxed compact disk, such as 17, protrude beyond the side walls, such as 13, to facilitate grasping while the unboxed compact cassettes, such as 15, may be pushed against rear wall 15.

In an actual embodiment of the invention there are three columns of compartments with 15 compartments in each column. The outside side walls join the edges of top and bottom walls that also engage the top and bottom edges of interior side walls 12 and 13 and back wall 11 with the outside side walls and top and bottom walls merging in rounded corner with all sides finished so that the compartment may be oriented in any direction. The structure is essentially 16¾ inches wide by 13 inches high by 5 inches deep.

There has been described novel apparatus and techniques for storing in any of a stacked array of storage compartments, boxed compact disks, boxed compact cassettes or unboxed compact cassettes. It is evident that those skilled in the art may now make numerous uses and modifications of and departures from the specific apparatus and techniques described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for storing compact disks and compact cassettes in each of a plurality of storage compartments comprising, a rear wall, at least first and second parallel side walls cantilevered from said rear wall each having a free edge and comprising means for defining therebetween a column of storage compartments, a plurality of opposed pairs of like protrusions extending from said side walls comprising means for defining a first storage region having a width $w_1$ corresponding substantially to the distance between said first and second side walls and a depth corresponding substantially to the width of each of said first and second side walls substantially equal to the width of a boxed compact disk and twice the width of an unboxed compact cassette and defining a height $h_2$ corresponding substantially to the height of a boxed compact disk, the width of each side panel being slightly less than the width of a boxed compact disk, said protrusions having means for defining a second region of width $w_2$ corresponding substantially to the length of a boxed compact cassette and a depth $d_2$ less than the width of a boxed compact cassette with said second storage region being spaced from said rear wall so that a boxed compact cassette stored in said second region protrudes outside the free edges of said side walls.

2. Apparatus for storing compact disks and compact cassettes in each of plurality of storage compartments in accordance with claim 1 wherein each of said protrusions is formed with a shelf with the length of each shelf being said distance $d_2$ that is less than the width of a boxed cassette and the separation between adjacent ones of said shelves in a direction parallel to a side wall being substantially equal to the height $h_2$ corresponding substantially to the height of a boxed compact cassette.

3. Apparatus for storing compact disks and compact cassettes in each of a plurality of storage compartments in accordance with claim 1 wherein said protrusions comprise blow-molded plastic structure having a flock coating.

4. Apparatus for storing compact disks and compact cassettes in each of a plurality of storage compartments in accordance with claim 2 wherein said protrusions comprise blow-molded plastic structure having a flock coating.

* * * * *